(12) United States Patent
Gomi et al.

(10) Patent No.: US 10,105,882 B2
(45) Date of Patent: *Oct. 23, 2018

(54) SHEET MANUFACTURING APPARATUS AND SHEET MANUFACTURING METHOD

(71) Applicant: SEIKO EPSON CORPORATION, Tokyo (JP)

(72) Inventors: Katsuhito Gomi, Matsumoto, Nagano (JP); Masahide Nakamura, Matsumoto, Nagano (JP); Yuki Yamamoto, Shiojiri, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/478,522

(22) Filed: Apr. 4, 2017

(65) Prior Publication Data
US 2017/0203478 A1 Jul. 20, 2017

Related U.S. Application Data

(63) Continuation of application No. 15/069,521, filed on Mar. 14, 2016, now Pat. No. 9,662,810, which is a (Continued)

(30) Foreign Application Priority Data

Jan. 23, 2014 (JP) .................. 2014-010156

(51) Int. Cl.
| | | |
|---|---|---|
| D21H 17/20 | (2006.01) |
| B29C 43/22 | (2006.01) |
| D21F 3/04 | (2006.01) |
| D21F 9/00 | (2006.01) |
| B29C 35/02 | (2006.01) |
| B29C 43/52 | (2006.01) |
| B29K 1/00 | (2006.01) |
| B29L 7/00 | (2006.01) |
| B29C 43/34 | (2006.01) |

(Continued)

(52) U.S. Cl.
CPC ............ *B29C 43/222* (2013.01); *B29C 35/02* (2013.01); *B29C 35/0277* (2013.01); *B29C 43/52* (2013.01); *D21F 3/04* (2013.01); *D21F 9/00* (2013.01); *D21H 17/20* (2013.01); *B29C 2043/3416* (2013.01); *B29K 2001/00* (2013.01); *B29K 2101/10* (2013.01);
(Continued)

(58) Field of Classification Search
CPC ... B29C 43/222; B29C 43/52; B29C 35/0277; B29C 2101/10; B29C 2043/3416; D21H 17/20; D21F 9/00; B29K 2105/06; B29K 2201/00
USPC ............................................... 162/164.1, 261
See application file for complete search history.

(56) References Cited

U.S. PATENT DOCUMENTS

| 4,597,930 A | 7/1986 | Szal |
| 5,422,170 A | 6/1995 | Iwata et al. |

(Continued)

FOREIGN PATENT DOCUMENTS

| CN | 102869822 A | 1/2013 |
| JP | 54-088369 A | 7/1979 |

(Continued)

*Primary Examiner* — Mark Halpern

(57) ABSTRACT

A sheet manufacturing method includes defibrating a defibration object into a defibrated material in the atmosphere, mixing, in the atmosphere, additive agents including resin into the defibrated material that has been defibrated, adding moisture to a mixture of the defibrated material and the additive agents after the mixing is completed, and heating the mixture that has been moisture-added.

8 Claims, 2 Drawing Sheets

Related U.S. Application Data continuation of application No. 14/571,685, filed on Dec. 16, 2014, now Pat. No. 9,315,941.

(51) Int. Cl.
    *B29K 101/10*     (2006.01)
    *B29K 105/06*     (2006.01)
    *B29K 201/00*     (2006.01)

(52) U.S. Cl.
    CPC ...... *B29K 2105/06* (2013.01); *B29K 2201/00* (2013.01); *B29L 2007/002* (2013.01)

(56) References Cited

U.S. PATENT DOCUMENTS

| | | |
|---|---|---|
| 5,668,216 A | 9/1997 | Kinkel et al. |
| 5,705,001 A | 1/1998 | Iwata et al. |
| 5,886,121 A | 3/1999 | Kinkel et al. |
| 2002/0100548 A1 | 8/2002 | Minami et al. |
| 2007/0292217 A1 | 12/2007 | Karpik |
| 2011/0247839 A1 | 10/2011 | Lalouch et al. |
| 2014/0027075 A1 | 1/2014 | Yamagami et al. |
| 2014/0290886 A1 | 10/2014 | Nagai et al. |
| 2014/0345882 A1 | 11/2014 | Lalouch et al. |
| 2015/0204015 A1 | 7/2015 | Gomi et al. |

FOREIGN PATENT DOCUMENTS

| | | | |
|---|---|---|---|
| JP | 06-114809 A | 4/1994 | |
| JP | 08-503255 A | 4/1996 | |
| JP | 08-252557 A | 10/1996 | |
| JP | 2001-269911 A | 10/2001 | |
| JP | 2002-235268 A | 8/2002 | |
| JP | 2012-144819 A | 8/2012 | |
| JP | 2013-065795 | * 3/2013 | ............ D21H 25/04 |

\* cited by examiner

SHEET MANUFACTURING APPARATUS AND SHEET MANUFACTURING METHOD

CROSS-REFERENCE TO RELATED APPLICATIONS

This application is a continuation application of U.S. Ser. No. 15/069,521 filed on Mar. 14, 2016, which is a continuation application of U.S. patent application Ser. No. 14/571,685 filed on Dec. 16, 2014, now U.S. Pat. No. 9,315,941. This application claims priority to Japanese Patent Application No. 2014-010156 filed on Jan. 23, 2014. The entire disclosures of U.S. patent application Ser. Nos. 15/069,521 and 14/571,685 and Japanese Patent Application No. 2014-010156 are hereby incorporated herein by reference.

BACKGROUND

Technical Field

The present invention relates to a sheet manufacturing apparatus and a sheet manufacturing method.

Related Art

Conventionally, fibrous materials are deposited and coupling forces act between the deposited fibers to obtain a sheet-like or film-like molded body. A representative example is the manufacture of paper by paper forming that uses water. Currently, paper forming is widely used as a method for manufacturing paper. Generally, paper manufactured by paper forming has a structure in which cellulose fibers originating from, for example, wood materials are entangled and are partially bonded by bonding forces such as hydrogen bonds.

However, paper forming is a wet type process requiring large quantities of water. In addition, after the paper has been formed, the need arises for dehydration and drying; therefore, the energy and time consumed become extremely large. Furthermore, the water used must be appropriately treated as wastewater. The apparatus used in paper forming often require large-scale utilities and infrastructure for water, power, and wastewater facilities, and is difficult to reduce in size.

Thus, from the perspective of saving energy and protecting the environment, methods that use almost no water, referred to as dry type methods, are anticipated as paper manufacturing methods that will replace paper forming. For example, Japanese Laid-Open Patent Application No. 2012-144819 discloses a paper recycling apparatus that defibrates and deinks the paper that becomes the raw material, adds a small amount of moisture, and forms the paper in a dry type process.

The performance demanded from sheets, such as paper, is mechanical strength, for example, tensile strength and tear resistance. In the technology described in Japanese Laid-Open Patent Application No. 2012-144819, the water moisture added during the formation of paper is believed to act to elicit hydrogen bonds originating in hydrogen groups as the bonding force between the fibers forming the paper. However, after the paper has been formed, the hydrogen bonds will have reduced bonding force in the presence of water. Therefore, in paper in which hydrogen bonding is used as the coupling force between the fibers, inadequate mechanical strength and shape deformation arise when the paper is placed in a high-humidity environment or is dampened by water. Consequently, binding a plurality of fibers with resin was considered. However, mechanical strength was inadequate at times even when bonded by resin. The cause was the lower moisture content contained in the fibers when the sheet was formed. One cause of the lower moisture content contained in the fibers was the loss of moisture during defibration in a dry type process when paper having relatively low moisture content was the raw material. Another cause was the lower moisture content originally included in the paper that became raw materials. This occurs when the manufacturing apparatus was installed in a low-humidity environment, and when the paper raw materials were placed in a low-humidity environment.

SUMMARY

One objective related to several embodiments of the present invention is to provide a sheet manufacturing apparatus and a sheet manufacturing method that are capable of manufacturing sheets having good mechanical strength and water resistance by using a dry type process.

The present invention solves at least a portion of the problems described above and can be implemented in the following embodiments or application examples.

According to a first aspect of the invention, a sheet manufacturing method comprises defibrating a defibration object into a defibrated material in the atmosphere, mixing, in the atmosphere, additive agents including resin into the defibrated material that has been defibrated, adding moisture to a mixture of the defibrated material and the additive agents after the mixing is completed, and heating the mixture that has been moisture-added.

According to the first aspect of the invention, the sheet manufacturing method further comprises depositing the mixture after the mixing, and the adding of the moisture includes adding the moisture to the mixture after the depositing.

According to the first aspect of the invention, the sheet manufacturing method further comprising pressing the mixture after the adding of the moisture and before the heating of the mixture.

According to a second aspect of the invention, a sheet manufacturing apparatus comprises a defibrating unit, a mixing unit, a moisture-adding unit, and a heating unit. The defibrating unit is configured to defibrate a defibration object in the atmosphere. The mixing unit is configured to mix, in the atmosphere, additive agents including resin into a defibrated material that has been defibrated by the defibrating unit. The moisture-adding unit is configured to add moisture to a mixture of the defibrated material and the additive agents, which has come out from the mixing unit. The heating unit is configured to heat the mixture that has been moisture-added by the moisture-adding unit.

According to the second aspect of the invention, the sheet manufacturing apparatus further comprises a deposition unit configured to deposit the mixture that has been mixed by the mixing unit, and the moisture-adding unit is configured to add moisture to the mixture deposited by the deposition unit.

According to the second aspect of the invention, the sheet manufacturing apparatus further comprises a pressing unit configured to press the mixture that has been moisture-added before the mixture that has been moisture-added is heated.

BRIEF DESCRIPTION OF THE DRAWINGS

Referring now to the attached drawings which form a part of this original disclosure.

DETAILED DESCRIPTION OF EXEMPLARY EMBODIMENTS

Several embodiments of the present invention will be described below. These embodiments describe examples of the present invention. The present invention is not limited to the following embodiments and includes various modified embodiments implemented within a scope that does not change the intent of the present invention. All of the configurations described below do not limit the essential configurations of the present invention.

1. Sheet Manufacturing Apparatus

Figure 1:
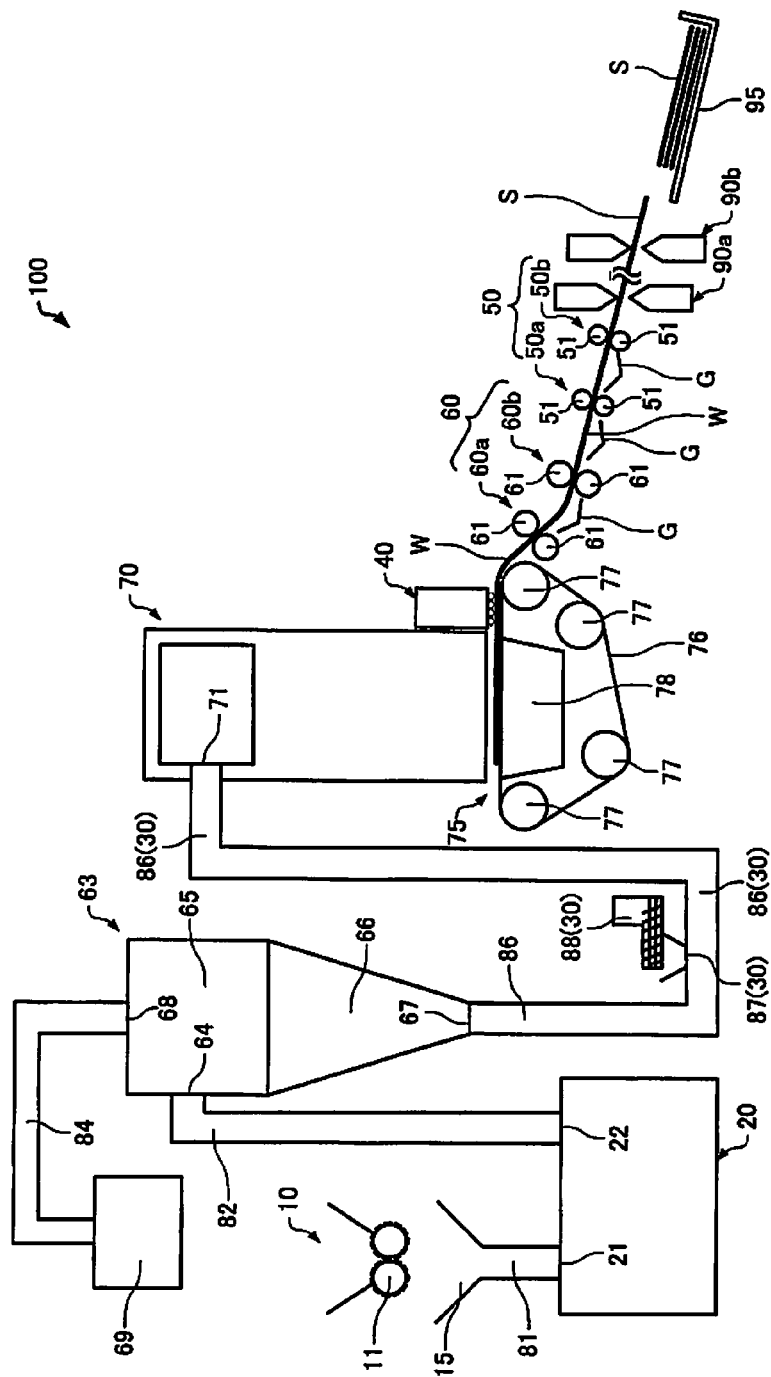
FIG. 1 is a schematic diagram illustrating a sheet manufacturing apparatus related to the embodiments.

A sheet manufacturing apparatus 100 related to the embodiment has a defibrating unit 20, a mixing unit 30, a moisture-adjusting unit 40, and a heating unit 50. FIG. 1 is a schematic diagram illustrating the sheet manufacturing apparatus 100 related to the embodiment. The sheet manufacturing apparatus 100 of the embodiment is described below centered on the defibrating unit 20, the mixing unit 30, the moisture-adjusting unit 40, and the heating unit 50.

1.1. Defibrating Unit

The defibrating unit 20 defibrates the defibration object. The defibrating unit 20 produces defibrated material refined into a fibrous form. The defibrating unit 20 also has a function that separates resin particles or granular materials, such as inks, toners, or blur-preventing agents that are bonded to the defibration object from the fibers, for example, when the defibration object is used paper.

Here, the term "defibrating process" indicates the refining of defibration object of a plurality of bonded fibers into individual fibers. The term "defibrated material" indicates the material that has passed through the defibrating unit 20. The term "defibrated material" also includes resin particles (resin for mutual bonding of a plurality of fibers) and ink particles of inks, toners, and blur-preventing agents when the fibers are refined, in addition to the refined fibers. The shapes of the refined defibrated material are string and ribbon shapes. The refined defibrated material may be in a form in which there is no entanglement with other refined fibers (independent form) or a form of entangled clumps of refined defibrated material (formed into a so-called "dam (lump)").

Furthermore, the terms "upstream" and "downstream" in this specification are used with respect to the flow (including the conceptual flow) of the materials of the manufactured sheet (e.g., raw materials, defibration object, defibrated material, and web) in the sheet manufacturing apparatus. The term "upstream" ("downstream") is a relative specification of the position in the configuration. For example, "A is upstream (downstream) of B" means that the position of A is upstream (downstream) with respect to the position of B with reference to the flow direction of the sheet material.

The defibrating unit 20 is provided further upstream than the mixing unit 30 to be described later. Other structures may be provided between the defibrating unit 20 and the mixing unit 30. In addition, other structures may be provided further upstream than the defibrating unit 20.

An option of the defibrating unit 20 is to be limited to having a function that defibrates the defibration object. The defibrating unit 20 defibrates in a dry type system in the atmosphere (in air). In the example shown, the defibration object that is introduced from an introduction port 21 is defibrated by the defibrating unit 20 to become defibrated material (fibers). The defibrated material discharged from a discharge port 22 is supplied through a pipe 82 and a classifier unit 63 to the mixing unit 30 (through pipe 86 in the example shown).

In this specification, a dry type system refers to use in the atmosphere (in air) and not in liquid. The dry type system category includes the dry state and the state in which a liquid (e.g., water) is present as an impurity or in which a liquid (e.g., water), water vapor, or mist has been intentionally added. It should be noted that in a dry type system and a wet type system, such as paper forming, the amounts of water used are completely different depending on the entire apparatus and the quantity of paper to be manufactured. That is, the amount of water when water is in a dry type system is an order of magnitude smaller than that in a wet type system.

The configuration of the defibrating unit 20 is not particularly restricted, and may include, for example, a rotary unit (rotor) and a stationary unit as a cover thereof, and a gap can be formed between the rotary unit and the stationary unit. In a defibrating unit 20 having this configuration, defibration is conducted by introducing the defibration object into the gap while the rotary unit is rotating. In this case, the rotational speed and the shape of the rotary unit and the shape of the stationary unit can be appropriately designed to satisfy demands such as the quality of the manufactured sheet and the overall configuration of the apparatus. Additionally, in this case, the rotational speed of the rotary unit (rotations per minute (rpm)) can be appropriately set when taking into consideration conditions that include the throughput of the defibration process, the residence time of the defibration object, the extent of defibration, the size of the gap, and the shapes and sizes of the rotary unit, stationary unit, and other parts.

More preferably, the defibrating unit 20 has a function that generates airflow in order to draw in the defibration object and/or to discharge the defibrated material. In this case, the defibrating unit 20 generates airflow and uses the generated airflow to draw in the defibration object from the introduction port 21, defibrates, and transfers the defibrated material to the discharge port 22. In the example shown in FIG. 1, the defibrated material discharged from the discharge port 22 is transferred in a pipe 82. If the defibrating unit 20 used does not have a mechanism for generating airflow, a mechanism that generates airflow for introducing defibration object to the introduction port 21 or generates airflow for discharging the defibrated material through the discharge port 22 may be installed externally.

1.1.1. Defibration Object

In this specification, the defibration object indicates products containing the raw materials of the sheet manufacturing apparatus 100. For example, these materials have entangled or bonded fibers and include pulp sheets, paper, used paper, tissue paper, paper towels, cleaning cloths, filters, liquid-absorbing materials, sound absorbing materials, cushioning materials, mats, and cardboard. In addition, the defibration object may include fibers (organic fibers, inorganic fibers, hybrid organic-inorganic fibers) consisting of rayon, lyocell, cupro, vinylon, acrylic, nylon, aramid, polyester, polyethylene, polypropylene, polyurethane, polyimide, carbon, glass, and metal. If a classifier unit 63, which is described later, is provided in the sheet manufacturing apparatus 100 of this embodiment, used paper, in particular, can be effectively used as the defibration object.

1.1.2. Defibrated Material

In the sheet manufacturing apparatus 100 of this embodiment, the defibrated material used as a part of the materials of the manufactured sheet is not particularly limited, and may be any material in a wide range of defibrated materials that can be formed into a sheet. The defibrated materials include fibers obtained by defibrating the materials to be defibrated described above. The fibers may be natural fibers (animal fibers, plant fibers) and synthetic fibers (organic fibers, inorganic fibers, hybrid organic-inorganic fibers). More specifically, the fibers included in the defibrated material may be composed of cellulose, silk, wool, cotton, hemp, kenaf, flax, ramie, jute, Manila hemp, sisal hemp, conifer, and broadleaf trees. These fibers may be used individually, appropriately mixed, or used as recycled fibers that have been refined. Defibrated materials become the materials of the manufactured sheet and may include at least one of these fibers. Additionally, the defibrated materials (fibers) may be dried, or may contain or absorb liquids such as water or organic solvents.

Furthermore, the defibrated materials (fibers) may be subjected to various surface processes.

When the fibers are individual fibers, the mean diameter of the fibers included in the defibrated materials used in this embodiment is from 1 µm to 1000 µm; preferably, from 2 µm to 500 µm; and more preferably, from 3 µm to 200 µm (when the cross section is not circular, the larger of the lengths in the lengthwise and perpendicular directions, or the diameter of a circle having an area assumed to be equal to that of the cross section (equivalent circle diameter)).

The lengths of the fibers included in the defibrated material used in this embodiment are not particularly limited. For example, the length of an individual fiber in the lengthwise direction of the fiber (hereafter, referred to as the "fiber length," which is the length in the lengthwise direction of the refined defibrated material (fibers)) is, in order to the most preferred, from 1 µm to 10 mm, from 1 µm to 8 mm, from 1 µm to 5 mm, from 2 µm to 3 mm, or from 3 µm to 2 mm. Because bonding to the additive agents (composites) is difficult for short fiber lengths, the sheet strength is sometimes unsatisfactory. However, if the lengths are within the above ranges, sheets with satisfactory strength can be obtained. The length in the lengthwise direction of a fiber is the distance between the two ends arranged in a nearly linear state (fiber length) when an individual fiber is stretched at both ends as needed without breaking the fiber. The mean length of a fiber as the length-length-weighted mean fiber length is from 20 µm to 3600 µm; preferably, from 200 µm to 2700 µm; and more preferably, from 300 µm to 2300 µm. Furthermore, the fiber length may fluctuate (have a distribution).

In this specification, fiber indicates an individual fiber or an aggregate of a plurality of fibers (e.g., a state resembling cotton). Defibrated material indicates a material containing a plurality of fibers, and includes fiber bundles and materials that become the raw materials of the sheet (materials in powder or cotton-like form).

1.2. Mixing Unit

The mixing unit 30 provided in the sheet manufacturing apparatus 100 of this embodiment has a function that mixes (mixes together) defibrated material and additive agents containing resin in the atmosphere. At least defibrated material and additive agents are mixed together by the mixing unit 30. Ingredients other than defibrated material and additive agents may be mixed by the mixing unit 30. In this specification, the phrase "defibrated material and additive agents are mixed" means that the additive agents are positioned between the fibers contained in the defibrated material within a constant volume space (system).

The configuration of the mixing unit 30 and the configuration and mechanisms thereof are not particularly limited if the mixing unit is able to mix defibrated material (fibers) and additive agents. The process state of mixing in the mixing unit 30 may be a batch process, a sequential process, or a continuous process. Additionally, the mixing unit 30 may be operated manually or operated automatically. Furthermore, the mixing unit 30 mixes at least defibrated material and additive agents, but is able to mix other ingredients.

The mixing unit 30 is provided downstream of the defibrating unit 20 described above. The mixing unit 30 is provided further upstream than the heating unit 50, which is described later. Structures in addition to the moisture-adjusting unit 40, which is described later, may be included between the mixing unit 30 and the heating unit 50. The other structures may be a refining unit 70 that refines the mixture of defibrated material and additive agents, a deposition unit 75 that forms the mixture into a web, or a pressing unit 60 that applies pressure to the mixture deposited into a web shape (each unit will be described later), but is not limited to these units. The mixture mixed by the mixing unit 30 may be further mixed by another structure, such as the refining unit 70. Thus, the refining unit 70 may also be regarded as a mixing unit.

Examples of the mixing process in the mixing unit 30 are mechanical mixing and hydrodynamic mixing. For example, mechanical mixing may be a method in which fibers (defibrated material) and additive agents are introduced into a Henschel mixer and stirred, or a method that seals the fibers (defibrated material) and additive agents in a pouch and agitates the pouch. In addition, the hydrodynamic mixing process may be a method that introduces fibers (defibrated material) and additive agents into airflow of the atmosphere to mutually diffuse the materials in the airflow. In the method that introduces fibers (defibrated material) and additive agents into airflow of the atmosphere, additive agents may be fed into pipes in which fibers of defibrated material are flowing (being transferred) in the airflow, or fibers (defibrated material) may be fed into pipes in which particles of the additive agents are flowing (being transferred) in the airflow. In these methods, more preferably, turbulent airflow in the pipes results in more efficient mixing.

The mixing unit 30 may be configured to include a feeder that introduces additive agents into the circulation path of the defibrated material. As illustrated in FIG. 1, when a pipe 86 is adopted to transfer defibrated material as the mixing unit 30, a method can be adopted that introduces additive agents by an additive agent supply unit 88 after the defibrated material has been made to flow in airflow of, for example, the atmosphere. When the pipe 86 is used as the mixing unit 30, the airflow generation means may be a blower, which is not shown. The only limit on the airflow generation means is the ability to carry out the above functions.

When the pipe 86 is used as the mixing unit 30, additive agents (including composites) may be introduced by opening and closing valves, or manually by a worker. However, a screw feeder as shown in FIG. 1 or a disk feeder, which is not shown, may be used as the additive agent supply unit 88. Use of these feeders is preferred because fluctuations in the included amounts (added amounts) of additive agents in the flow direction of the airflow can be reduced. The same applies when the additive agents are transferred by airflow, and the defibrated material is introduced into that airflow. In the illustrated examples, additive agents are supplied from the additive agent supply unit 88 to the pipe 86 through a supply port 87 provided in the pipe 86. Thus, in the illustrated example, the mixing unit 30 is configured from a portion of the pipe 86, the additive agent supply unit 88, and the supply port 87.

In the sheet manufacturing apparatus 100 of this embodiment, the mixing unit 30 is an embodiment of a dry type system. Here, "dry type system" for mixing is mixing that is conducted in the atmosphere (in air) and not in liquid.

When a liquid is intentionally added to a degree that does not interfere with the mixing action in the mixing unit 30, preferably, the liquid is added so that the energy and time needed in order to remove the liquid in subsequent processes by heating do not become too large.

As long as defibrated material and additive agents can be mixed, the processing capacity of the mixing unit 30 is not particularly limited and can be appropriately designed and adjusted in response to the manufacturing capacity (throughput) of the sheet manufacturing apparatus 100. If batch processing is used, the processing capacity of the mixing unit 30 can be adjusted by changing the size of the processing vessel and the charged amount. Additionally, when the pipe 86 and the additive agent supply unit 88 described above are adopted as the mixing unit 30, the flow rate of air for transferring defibrated material and additive agents in the pipe 86, the introduced amount of materials, and the amount transferred can be changed. Defibrated material and additive agents can be satisfactorily mixed when the pipe 86 and the additive agent supply unit 88 as shown are adopted as the mixing unit 30.

The additive agents supplied from the additive agent supply unit 88 include resin for bonding a plurality of fibers. When additive agents are supplied to the pipe 86, there is no intentional mutual bonding between the plurality of fibers included in the defibrated material except when the defibration was inadequate. The resin included in the additive agents melts or softens when passed through the heating unit 50, which is described later, and then hardens to bond the plurality of fibers. When passed through the heating unit 50, the plurality of fibers is bonded by hydrogen bonds by removing moisture that was supplied by the moisture-adjusting unit 40.

1.2.1. Additive Agents

The additive agents supplied from the additive agent supply unit 88 include resins. The types of resins may be natural resins or synthetic resins, or may be thermoplastic resins or thermosetting resins. In the sheet manufacturing apparatus 100 of this embodiment, preferably, the resin is solid at room temperature, and is a thermoplastic resin, in light of the bonding of the fibers by heat in the heating unit 50.

The natural resins may be rosin, dammar, mastic, copal, amber, shellac, dragon's blood, sandarac, or colophony. These resins may be used separately or appropriately mixed. Resins may be subjected to appropriate chemical modification.

Thermosetting resins among the synthetic resins may be phenolic resins, epoxy resins, melamine resins, urea resins, unsaturated polyester resins, alkyd resins, polyurethane, or thermosetting polyimide resins.

The thermoplastic resins among the synthetic resins may be acrylonitrile-styrene resins, acrylonitrile-butadiene-styrene resins, polypropylene, polyethylene, polyvinyl chloride, polystyrene, acrylic resin, polyester resin, polyethylene terephthalate, polyphenylene ether, polybutylene terephthalate, nylon, polyamide, polycarbonate, polyacetal, polyphenylene sulfide, or polyether ether ketone.

These resins may be used individually or appropriately mixed. In addition, the resins may be copolymerized or modified. These resin systems may be styrene-based resins, acrylic-based resins, styrene-acrylic-based copolymer resins, olefin-based resins, vinyl-chloride-based resins, polyester-based resins, polyamide-based resins, polyurethane-based resins, polyvinyl-alcohol-based resins, vinyl-ether-based resins, N-vinyl-based resins, or styrene-butadiene-based resins.

The forms of the additive agents may be fibers or powders. If the additive agents are fibers, the preferred fiber length of an additive agent is less than the fiber length of the defibrated material. Specifically, the fiber length of an additive agent is 3 mm or less, or more preferably, 2 mm or less. If the fiber length of an additive agent is longer than 3 mm, sometimes, more uniform mixing with the defibrated material becomes difficult. If the additive agent is a powder, the grain size (diameter) of the additive agent is from 1 $\mu$m to 50 $\mu$m, or preferably, from 2 $\mu$m to 20 $\mu$m. If the grain size of the additive agent is less than 1 $\mu$m, sometimes, the bonding force for bonding together the fibers in the defibrated material is reduced. If the grain size of the additive agent is greater than 20 $\mu$m, sometimes, good uniform mixing with the defibrated material is difficult; the bonding force to the defibrated material is reduced; the additive agents separate from the defibrated material; and the manufactured sheet is uneven.

The amount of additive agents supplied from the additive agent supply unit 88 is appropriately set to correspond to the type of manufactured sheet. For example, the proportion of additive agents with respect to the defibrated material is from 5% by weight to 70% by weight. From the perspective of obtaining a well-mixed mixture in the mixing unit 30 and the perspective of preventing the additive agents from falling off due to gravity when the mixture is formed into a web shape, the preferred amount is from 5% by weight to 50% by weight. In the example shown, the supplied additive agents are mixed with the defibrated material in the pipe 86 that is configured as the mixing unit 30.

The additive agents may include other ingredients in addition to resin. The other ingredients may be coagulation inhibitors, colorings, organic solvents, surfactants, anti-mildew agents, antiseptic agents, anti-oxidation agents, ultraviolet light-absorbing agents, and oxygen-absorbing agents. The coagulation inhibitors and the colorings are described in detail below.

1.2.1.1. Coagulation Inhibitors

In addition to resins for bonding the defibrated material, additive agents may also include coagulation inhibitors in order to suppress coagulation between the fibers in the defibrated material and coagulation between resins in the additive agents. When a coagulation inhibitor is included in the additive agents, preferably, the resin and the coagulation inhibitor are integrated into one body. Specifically, when the coagulation inhibitor is included in the additive agent, preferably, the additive agent is a composite having the resin and the coagulation inhibitor in one body.

In this specification, composites are particles composed of resin as one ingredient and another ingredient that are formed into one body. The other ingredient may be a coagulation inhibitor or a coloring, and includes ingredients that have forms, sizes, substances, and functions that differ from those of the resin, which is the main ingredient.

In a comparison of combining the coagulation inhibitor with the additive agent and not combining with the coagulation inhibitor, the resin and the coagulation inhibitor are more difficult to mutually coagulate when integrated into one body in a composite. Various types of coagulation inhibitors may be used, but in the sheet manufacturing apparatus 100, a type that is arranged on the surface of the composite (such as a coating) is preferred because water is not used or almost no water is used in the mixing unit 30.

This coagulation inhibitor is composed of fine particles composed of inorganic matter, but is able to obtain a superior coagulation inhibition effect when arranged on the surface of the composite. Coagulation refers to the state in which identical or different bodies are physically connected by electrostatic forces or van der Waals forces. Additionally, the uncoagulated state for an aggregate of a plurality of bodies (e.g., powders) does not necessarily indicate that all of the bodies forming the aggregate are in a dispersed arrangement. That is, the uncoagulated state also includes the state in which a portion of the bodies forming the aggregate has coagulated. The amount of these coagulated bodies is 10% by weight or less, preferably approximately 5% by weight or less, of the entire aggregate. This state includes the "uncoagulated state" in an aggregate of a plurality of bodies. Furthermore, when a powder is packed, the powder particles are in contact with each other. The uncoagulated state includes the state in which the particles are dispersed by external forces that do not destroy the particles, such as gentle stirring, scattering by airflow, or free fall.

Specific examples of coagulation inhibitors are silica, titanium oxide, aluminum oxide, zinc oxide, selenium oxide, magnesium oxide, zirconium oxide, strontium titanate, barium titanate, and calcium carbonate. A portion of the materials used as coagulation inhibitors (e.g., titanium oxide) is the same as those used as colorings. The difference is that the grain size of a coagulation inhibitor is smaller than the grain size of a coloring. Therefore, a coagulation inhibitor does not greatly affect the color tone of the manufactured sheet and can be differentiated from the coloring. However, when the color tone of the sheet is adjusted, some effects such as light scattering may occur even if the grain size of the coagulation inhibitor is smaller. Preferably, these effects should be taken into account.

The mean grain size of the particles in the coagulation inhibitor (mean diameter of several particles) is not particularly specified, but is preferably, 0.001 to 1 μm, or more preferably, 0.008 to 0.6 μm. The particles of the coagulation inhibitor are categorized as so-called nanoparticles and generally become the primary particles because their grain size is small. However, the particles of the coagulation inhibitor may be a plurality of primary particles bonded together to become high-order particles. If the grain size of the primary particles in the coagulation inhibitor is within the above range, good coating of the surface of the resin is possible, and an adequate coagulation inhibition effect of the composite can be provided. Coagulation of composite powder in which coagulant inhibitors are arranged on the surfaces of resin particles is suppressed because coagulation inhibitor is present between the composites. The coagulation inhibition effect between resin particles is considered to be less when the resin and the coagulation inhibitor are not integrated but are separate bodies compared to when they are integrated because coagulation inhibitor is not always present between the resin particles.

The included amount of coagulation inhibitor in the composite of resin and coagulation inhibitor integrated into one body is preferably from 0.1 parts by weight to 5 parts by weight with respect to 100 parts by weight of resin. For this included amount, the effects described above can be obtained. In addition, from the perspective of improving the above effect and/or suppressing the falling off of the coagulation inhibitor from the manufactured sheet, the included amount is preferably 0.2 parts by weight to 4 parts by weight, or more preferably, 0.5 parts by weight to 3 parts by weight with respect to 100 parts by weight of resin.

When coagulation inhibitor is arranged on the surface of the resin, if the percentage of the composite surface that is coated with coagulation inhibitor (area ratio, sometimes referred to as coverage in this specification) is from 20% to 100%, a satisfactory coagulation inhibition effect can be obtained. Coverage can be adjusted by charging to an apparatus like a fiber material (FM) mixer. Furthermore, if the specific surface areas of the coagulation inhibitor and the resin are known, adjustments are possible based on the mass (weight) of each component during charging. In addition, coverage can be measured by various electron microscopes. In a composite in which the coagulation inhibitor is arranged so that falling off of the resin is difficult, the coagulation inhibitor and the resin can be integrated into one body.

If the coagulation inhibitor is combined with the composite, coagulation of the composite can become extremely difficult. Therefore, additive agents (composites) and defibrated material can be more readily mixed in the mixing unit 30. That is, when the coagulation inhibitor as a composite of resin is combined in the additive agents, a uniform mixture of defibrated material and additive agents can be formed more rapidly as compared with the inability to mix in the coagulation inhibitor because of the rapid diffusion of the composite into the space.

The reason why the composites and the defibrated material can be mixed well by airflow or by the stirring of the mixer by using a coagulation inhibitor is the tendency of the composites to readily develop static electricity when coagulation inhibitor is arranged on the surfaces of the composites, and the static electricity suppresses coagulation of the composites. Studies by the inventors showed that there is a high probability that composites adhering to the fibers due to static electricity will not easily separate from the fibers even when mechanical collisions occur. Because of this tendency, when the coagulation inhibitor is combined with the additive agents as the composites, the composites are believed to not easily separate once they adhere to the fibers and to rapidly mix without the use of special means in addition to mixing the fibers with the composites. The actions of the mixing unit 30 mix the defibrated material (fibers) and the composites. After the mixture is produced, adhesion of the composites to the fibers is stable, and separation of the composites is not seen.

1.2.1.2. Coloring

In addition to the resin that bonds the fibers of the defibrated material, the additive agents may also include coloring. If coloring is included in the additive agents, preferably, the resin and the coloring are integrated into one body. That is, the additive agents are preferably composites having resin and coloring in one body. In addition, even if the composite includes a coagulation inhibitor as described above, the composite may have resin, coloring, and coagulation inhibitor formed in one body. That is, the additive agents may include composites that have resin, coagulation inhibitor, and coloring in one body.

A composite having resin and coloring in one body refers to the state in which separation of the coloring (difficulty falling off) is difficult in the sheet manufacturing apparatus 100 and/or in the manufactured sheet. A composite having resin and coloring in one body indicates the state in which the coloring is mutually bonded by resin, the state in which the coloring is structurally (mechanically) fixed to the resin, the state in which the resin and the coloring are coagulated by static electricity or van der Waals forces, and the state in which the resin and the coloring are chemically bonded. The state in which the composite is resin and coloring in one body may include the state of the coloring encapsulated by the resin or the state in which the coloring adheres to the resin, and the state in which these two states coexist.

FIG. 2 schematically illustrates several states of the cross-sectional plane of a composite having resin and coloring in one body. Examples of the specific state of a composite having resin and coloring in one body are a composite 3 that is configured to include a single coloring or a plurality of colorings 2 dispersed in a resin 1 as shown in FIGS. 2A to C, and a composite 3 in which a single coloring or a plurality of colorings 2 adheres to the surface of resin 1 as shown in FIG. 2D. In the sheet manufacturing apparatus 100 of this embodiment, an aggregate (powder) of these composites 3 may be used as the composite.

Figure 2A:
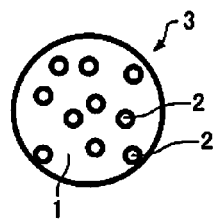
FIGS. 2A-2D are schematic diagrams illustrating several examples of cross-sections of composites related to the embodiments.
Figure 2B:
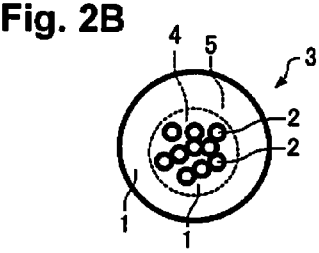
Figure 2C:
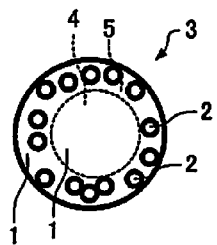

FIG. 2A illustrates an example of a composite 3 that has a constitution in which a plurality of colorings 2 (represented as powder) is dispersed in resin 1 to form a composite 3. This type of composite 3 becomes a so-called island structure in which resin 1 is dispersed as the matrix and the coloring 2 as the domain. In this example, because the coloring 2 is enclosed by the resin 1, it would be difficult for the coloring 2 to pass through the resin part (matrix) and separate from the resin 1. Therefore, in the resulting state, it is difficult for coloring 2 to fall off of the resin part when subjected to various processes or when formed into a sheet in the sheet manufacturing apparatus 100. The dispersed state of coloring 2 in the composite 3 may have coloring 2 in mutual contact or may have resin 1 between the coloring 2. In FIG. 2A, the coloring 2 is dispersed throughout, but may be biased to one side. For example, the coloring 2 may be only on the right side or the left side in the drawing. When the dispersion is biased to one side, the coloring 2 may be arranged in the center portion of the resin 1 as in FIG. 2B, or the coloring 2 may be arranged in a section close to the surface of the resin 1 as in FIG. 2C. The resin 1 may have mother particles 4 near the center and a shell 5 surrounding the particles. The mother particles 4 and the shell 5 may be mutually similar types or different types of resins.

Figure 2D:
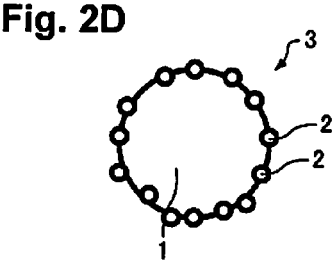

The example illustrated in FIG. 2D is a composite 3 in which the coloring 2 is embedded near the surface of a particle composed of resin 1. In this example, the coloring 2 is exposed at the surface of the composite 3, but has difficulty falling off of the composite 3 because the coloring adheres (chemical or physical bonding) to the resin 1 or is mechanically fixed by the resin 1. This type of composite 3 can be suitably used in the sheet manufacturing apparatus 100 of the embodiment as the composite 3 having resin 1 and coloring 2 in one body.

In this example, the coloring 2 may be arranged inside of and not only on the surface of the resin 1.

Several states of composites having resin and coloring in one body were described. However, the state is not limited to states in which it is difficult for the coloring to fall off of the resin when subjected to various processes or when the sheet is formed in the sheet manufacturing apparatus 100, and may be any state in which it is difficult for the coloring to fall off of the resin is acceptable, such as the state in which the coloring adheres to the surfaces of the resin particles by electrostatic forces or by van der Waals forces. In addition, even in the state that is a combination of a plurality of the states described above, any state in which it is difficult for the coloring to fall off of the composite may be adopted.

The preferred arrangement in the composite of the coagulation inhibitor described in paragraph "1.2.1.1. Coagulation inhibitor" is conceptually similar to the arrangement illustrated in FIG. 2D. However, it should be noted that the coagulation inhibitor has a smaller grain size than the coloring 2. When a coloring is integrated into one body in any of the arrangements in FIGS. 2A to 2D, the coagulation inhibitor can be formed on the surface of the composite having resin and coloring in one body.

Coloring has a function of designating the color of the sheet manufactured by the sheet manufacturing apparatus 100 of this embodiment. The colorings may be dyes or pigments. When integrated into one body with resin in a composite, preferably, pigments are used from the perspective of obtaining improved hiding power and color development.

The colors and types of pigments are not particularly limited. For example, pigments in the variety of colors used in common inks (e.g., white, blue, red, yellow, cyan, magenta, black, and special colors (particularly, pearl and metallic luster)) can be used. The pigments may be inorganic or organic pigments. The pigments may be the well-known pigments described in Japanese Laid-Open Patent Application Nos. 2012-87309 and 2004-250559. In addition, the white pigments may be zinc oxide, titanium oxide, antimony white, zinc sulfide, clay, silica, white carbon, talc, and alumina white. These pigments may be used individually or in appropriate mixtures. If a white pigment of the pigments described above is used, a pigment composed of powder that includes particles (pigment particles) with titanium oxide as the main ingredient may be used, and is preferred because the refractive index of titanium oxide is high so the manufactured sheet has a high whiteness level with a small blended amount of pigment.

In the mixing unit 30, defibrated material and additive agents described above are mixed together, but the mixing ratios thereof can be more appropriately adjusted based on the strength, properties, and uses of the manufactured sheet. For example, if the manufactured sheet is for office use, such as copy paper, the percentage of additive agents with respect to defibrated material is from 5% by weight to 70% by weight. From the perspective of obtaining a good mixture in the mixing unit 30 and the perspective of inhibiting the falling off of additive agents due to gravity when the mixture is formed into a web shape, the preferred percentage is from 5% by weight to 50% by weight.

1.3. Moisture-Adjusting Unit

The moisture-adjusting unit 40 provided in the sheet manufacturing apparatus 100 of this embodiment has a function for adjusting the moisture of the mixture of defibrated material and additive agents from the mixing unit 30 described above. Here, moisture adjustment refers to the addition of water and/or water vapor to the mixture to adjust the weight ratio of the mixture and water. The addition of water during moisture adjustment, for example, when the moisture-adjusting unit 40 uses spraying, includes spraying an aqueous solution that contains water as a solvent and spraying a dispersion liquid that contains water as the dispersion medium, in addition to adding water by spraying water. Furthermore, the addition of water during moisture adjustment includes using water vapor (steam) to add water.

The moisture-adjusting unit 40 provides water to the mixture. When the moisture-adjusted mixture is heated in the heating unit 50, which is described later, hydrogen bonds between the fibers of the sheet S that is obtained are efficiently elicited by the evaporation of at least a portion of the water provided by the moisture-adjusting unit 40.

If the moisture-adjusting unit 40 can provide water to the mixture, the configuration, structure, and mechanisms thereof are not particularly limited. The processing state of the moisture-adjusting unit 40 may be a batch process, a serial process, or a continuous process. In addition, the moisture-adjusting unit 40 may be operated manually or automatically. Examples of specific configurations of the moisture-adjusting unit 40 include a configuration that sprays water from a nozzle onto the mixture, a configuration that blows steam (water vapor), and a configuration that provides mist obtained from, for example, ultrasonic vibrations.

The moisture-adjusting unit 40 is installed downstream of the mixing unit 30 as described above and upstream of the heating unit 50. Other structures may be installed between the mixing unit 30 and the heating unit 50. The other structures may be, but are not limited to, a refining unit 70 that refines the mixture of defibrated material and additive agents, a deposition unit 75 that forms the mixture into a web shape, or a pressing unit 60 that applies pressure to the mixture deposited in the web shape (each unit will be described later). However, when the sheet manufacturing apparatus 100 is provided with a refining unit 70, preferably, the moisture-adjusting unit 40 is provided further downstream than the refining unit 70 because of the potential of water obstructing the refining operation of the refining unit 70. As in the illustrated examples, when the sheet manufacturing apparatus 100 is provided with a deposition unit 75, the moisture-adjusting unit 40 may be arranged downstream of the deposition unit 75 so that moisture is provided to the web W of the deposited mixture. In this case, the moisture provided to the mixture by the moisture-adjusting unit 40 is easily supplied to the entire mixture (deposited material). Therefore, the strength of the manufactured sheet can be further improved.

In the illustrated examples, the moisture-adjusting unit 40 is arranged downstream of the deposition unit 75 and upstream of the pressing unit 60, but may be arranged downstream of the pressing unit 60. Furthermore, although not shown, the moisture-adjusting unit 40 may be arranged at a position that enables providing moisture to the mixture that drops from the refining unit 70.

Furthermore, the moisture-adjusting unit 40 may be integrated with the refining unit 70 or the deposition unit 75. The moisture-adjusting unit 40 may be configured to include, for example, pipes connected to external utility pipes, pumps, and various input and output terminals.

The moisture-adjusting unit 40 adjusts moisture so that the moisture content with respect to 100 parts by weight of the mixture before moisture adjustment is from 0.5 parts by weight to 20 parts by weight. If the moisture content provided by the moisture-adjusting unit 40 is within this range, hydrogen bonding can be elicited between the fibers in the manufactured sheet; the mechanical strength of the sheet can be improved; and the amounts of water and energy used by the equipment can be reduced. In order of increasing preference, the preferred moisture adjustments by the moisture-adjusting unit 40 are from 1 part by weight to 15 parts by weight of moisture content with respect to 100 parts by weight of the mixture, from 3 parts by weight to 14 parts by weight, from 5 parts by weight to 12 parts by weight, and from 7 parts by weight to 8 parts by weight. If the moisture is adjusted to this level, the mechanical strength of the manufactured sheet S is good; and water and energy can be efficiently used.

According to studies by the inventors, when the defibration object is pulp sheet, and the additive agent is a powder of polyester resin, the tensile strength and rupture stress of the formed sheet S is three fold or more when the moisture content provided to the mixture by the moisture-adjusting unit configured to spray water is from 5 parts by weight to 12 parts by weight with respect to 100 parts by weight of the mixture than when a moisture content of 0 parts by weight (no addition of water by the moisture-adjusting unit) was provided.

The moisture content provided by the moisture-adjusting unit 40 can be adjusted by using valves to supply, for example, water. The moisture content can be adjusted to a predetermined value that takes into account the amount of material (defibration object) for the sheet manufacturing apparatus or the mass balance such as the throughput of the defibrating unit 20. In addition, the moisture content can be adjusted in response to, for example, the mass balance of the apparatus, the moisture content included in the defibration object, and the humidity of the installation environment of the apparatus.

The moisture-adjusting unit 40 may be configured to adjust the provided moisture content based on information related to the moisture content, the humidity, and the temperature measured, for example, by a moisture content measuring unit, a humidity measuring unit, and a temperature measuring unit, which are not shown. For example, the moisture content of the mixture before and after moisture adjustment may be measured by apparatus based on well-known optical or electromagnetic principles that are arranged at appropriate positions inside or outside of the sheet manufacturing apparatus 100. In addition, the humidity and the temperature can be measured by the commonly known hygrometer and thermometer that are arranged at appropriate positions inside or outside of the sheet manufacturing apparatus 100. The sheet manufacturing apparatus 100 may have a control unit, which is not shown, to control the degree of opening of the valves based on these measurements.

The moisture-adjusting unit 40 may adjust the moisture so that the moisture content after adjusting the moisture of the mixture is much greater than the moisture content included in the defibration object. When moisture is included in the defibration object that becomes a part of the raw materials, a portion or all of the included moisture is sometimes evaporated and lost when the defibration object passes through the defibrating unit 20 followed by the defibrated material passing through the mixing unit 30. In this case, the amount of moisture exceeding the amount lost may be added by the moisture-adjusting unit 40. Thus, hydrogen bonds can be more reliably formed in the manufactured sheet S because the moisture dispersed and lost in the sheet manufacturing apparatus 100 can be satisfactorily replenished.

The processing capacity of the moisture-adjusting unit 40 can be appropriately designed and adjusted in response to the manufacturing capacity (throughput) of the sheet manufacturing apparatus 100. When passed through the heating unit 50, the moisture supplied by the moisture-adjusting unit 40 is heated and removed by evaporation. In this case, the plurality of fibers in the sheet S is bonded by hydrogen bonding.

1.4. Heating Unit

The sheet manufacturing apparatus 100 of this embodiment is provided with a heating unit 50. The heating unit 50 is arranged further downstream than the moisture-adjusting unit 40 described above.

The heating unit 50 heats the mixture that was mixed by the mixing unit 30 and had the moisture therein adjusted by the moisture-adjusting unit 40 to cause the plurality of fibers to be mutually bonded by the additive agents and produce a state in which hydrogen bonds are formed between the fibers. For example, the moisture-adjusted mixture may be formed into a web shape. In addition, the heating unit 50 may have a function that forms the mixture into a predetermined shape.

In this specification, the phrase "defibrated material and additive agents are bonded" refers to the state in which fibers and additive agents in the defibrated material are difficult to separate, and to the state in which a resin additive agent is arranged between the fibers and separating the fibers via the additive agent becomes difficult. Bonding is a concept that includes adhesion and includes the state in which two or more bodies are in contact and are difficult to separate. When fibers are bonded by a composite, the fibers may be parallel or intersect, and a plurality of fibers may bond to a single fiber. The phrase "fibers are hydrogen bonded" refers to partial or total bonding (adhesion) of a plurality of fibers by hydrogen bonding.

When resin, which is one constituent ingredient of the additive agents, is a thermoplastic resin, and is heated to a temperature above the vicinity of the glass transition temperature (softening point) or the melting point (if a crystalline polymer), the resin softens and melts, and later when the temperature decreases, the resin hardens. The resin can soften and come into contact with and entangle the fibers, and the fibers and additive agents can mutually bond when the resin hardens. Fibers bond with other fibers during hardening. When the resin in the additive agents is a thermosetting resin, the fibers and the resin can bond even when heated to a temperature above the softening point, or when heated above the curing temperature (temperature that produces the curing response). Preferably, the melting point, the softening point, and the curing temperature of the resin are lower than the melting point, the decomposition temperature, and the carbonization temperature of the fibers. Preferably, the types of resin and fibers are selected in combinations that produce these relationships.

Additionally, the heating unit 50 evaporates a part or all of the moisture contained in the moisture-adjusted mixture. Thus, hydrogen bonds can be formed between the fibers by reducing (removing) the water molecules between the fibers. Preferably, the heating unit 50 is set to a temperature above the boiling point of water, but if hydrogen bonds can be formed, heating may be to a temperature below the boiling point of water.

The heating unit 50 may also apply pressure in addition to providing heat to the mixture. In this case, the heating unit 50 has a function that forms the mixture into a predetermined shape. The magnitude of the applied pressure is appropriately adjusted for the type of sheet to be formed and can be from 50 kPa to 30 MPa. If the applied pressure is small, a sheet with large porosity is obtained. If the applied pressure is large, a sheet with small porosity (high density) is obtained.

A specific configuration of the heating unit 50 includes heater rollers, thermopress molding apparatus, hot plates, hot air blowers, infrared heaters, and flash fixing apparatus. In the sheet manufacturing apparatus 100 of this embodiment shown in FIG. 1, the heating unit 50 is configured from heating rollers 51. In the illustrated example, the heating unit 50 heats a web W that was pressed by the pressing unit 60, which is described later. The heating unit 50 may also have the function of applying pressure to the web W. Then by heating the web W, fibers included in the web W can be bonded together by additive agents and by hydrogen bonds.

In the illustrated example, the heating unit 50 is configured to heat and apply pressure to the web W sandwiched between rollers, and has a pair of heating rollers 51. The respective center axes of the pair of heating rollers 51 are parallel. The heating unit 50 may be configured from parallel plate presses, in addition to being configured from rollers. In this case, a buffer unit, which is not shown, is provided as needed to temporarily give slack to the web that is being transferred while being pressed. Also, by configuring the heating unit 50 from heating rollers 51, the sheet S can be formed while the web W is continuously transferred compared to when the heating unit 50 is configured as a parallel plate pressing unit.

Figure 3:
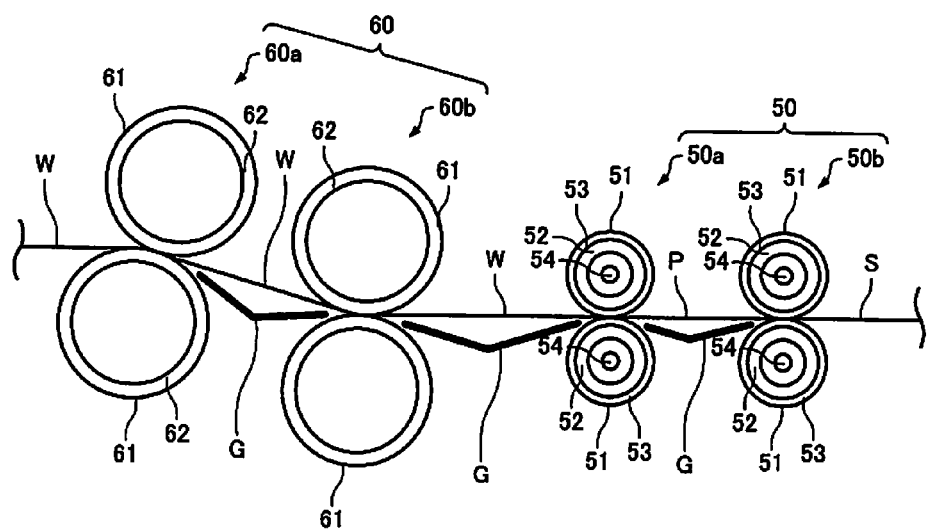
FIG. 3 is a schematic diagram of important parts of the sheet manufacturing apparatus related to the embodiments.

FIG. 3 schematically shows the configuration in the vicinity of the heating unit 50 in the sheet manufacturing apparatus 100. The heating unit 50 in the sheet manufacturing apparatus 100 of this embodiment is provided with a first heating unit 50a arranged upstream in the transfer direction of the web W and a second heating unit 50b arranged downstream. Each of the first heating unit 50a and the second heating unit 50b is provided with a pair of heating rollers 51.

A guide G that assists in the transfer of the web W is arranged between the first heating unit 50a and the second heating unit 50b.

For example, the heating rollers 51 are composed of hollow cored bars 52 of aluminum, iron, or stainless steel. A separation layer 53 of a tube containing fluorine such as tetrafluoroethylene-perfluoroalkylvinylether copolymer (PFA) or polytetrafluoroethylene (PTFE) or a fluorine coating such as PTFE is provided on the surfaces of the heating rollers 51. An elastic layer of silicone rubber, urethane rubber, or cotton may be provided between the cored bar 52 and the separation layer 53. By providing this elastic layer, when the pair of heating rollers 51 is pressing with a heavy load, the pair of heating rollers 51 can be uniformly in contact in the axial direction of the heating rollers 51.

A heating material 54 such as a halogen heater is provided in the center part of the cored bar 52 as a heating means. The temperatures of the heating rollers 51 and the heating material 54 are obtained by a temperature-detecting unit, which is not shown. The drive of the heating material 54 is controlled on the basis of the obtained temperatures. Thus, the surface temperatures of the heating rollers 51 can be maintained at predetermined temperatures. The web W being transferred can be heated and pressurized by passing the web W between the heating rollers 51. The heating means is not limited to a halogen heater and may be, for example, heating means by a contact-free heater or heating means that uses hot air.

The illustrated heating unit 50 is an example with two groups of a pair of heating rollers 51. However, when heating rollers 51 are used as the heating unit 50, the number and arrangements of the heating rollers 51 are not limited and can have any configuration within the scope of being able to achieve the above actions. The configuration of the heating rollers 51 in each heating unit 50 (thicknesses and materials of the separation layer, elastic layer, and cored bar; diameters of rollers) and the load pressing on the heating rollers 51 may differ in each heating unit 50.

As described above, resin contained in the additive agents is fused by passing through the heating unit 50 (heating process), easily becomes entangled with the fibers in the defibrated material, and causes the fibers to bond by hydrogen bonding. The mixture of moisture-adjusted defibrated material and additive agents is passed through the heating unit 50 and becomes the sheet S.

In this specification, the sheet S refers to a configuration in which a plurality of fibers is bonded by resin in two and three dimensions and is bonded by hydrogen bonding.

The sheet in this specification is not limited to a sheet shape and may be shaped like a film, a board, a web, or a shape with indentations and bumps. Also, the sheet in this specification can be classified as paper and nonwoven material. For example, paper includes raw materials of pulp or used paper formed into sheets, and includes recording paper, wallpaper, wrapping paper, colored paper, drawing paper, Kent paper, etc. with the objectives of writing and printing. Nonwoven material is thicker and has lower strength than paper, and includes typical nonwoven materials, fiberboard, tissue paper, paper towels, cleaning cloths, filters, liquid-absorbing materials, sound-absorbers, cushions, mats, etc.

1.5. Actions and Effects

According to the sheet manufacturing apparatus 100 of this embodiment, it is possible to manufacture the sheet S provided with bonding forces between the fibers of the defibrated material by resin and hydrogen bonding. That is, the fibers of the defibrated material can be bonded together by resin and by hydrogen bonds. In addition, in the sheet manufacturing apparatus 100 of this embodiment, moisture is adjusted after the mixture of defibrated material and additive agents is obtained. Therefore, as compared with adding moisture before the mixture is obtained, the additive agents can be better dispersed among the fibers in the sheet S. Thus, according to this sheet manufacturing apparatus 100, a sheet S having good water resistance and high mechanical strength can be manufactured by a dry type method.

For example, even if the bonding forces of the hydrogen bonds between the fibers are reduced when a sheet S manufactured by the sheet manufacturing apparatus 100 of this embodiment is placed in a high-humidity environment or is dampened by water, bonding in the defibrated material by resin can be maintained. Therefore, the sheet maintains mechanical strength and has good water resistance that resists shape deformation.

Furthermore, according to the sheet manufacturing apparatus 100 of this embodiment, because there is a moisture-adjusting unit 40 for adjusting the moisture of the mixture of defibrated material and additive agents, hydrogen bonds can be adequately elicited as the bonding forces between the fibers forming the sheet S even when a dried defibration object was used or when installed in a low-humidity environment.

1.6. Other Configurations

The sheet manufacturing apparatus 100 of this embodiment can have various configurations that include a crushing unit, a classifier unit, a pressing unit, a screening unit, a refining unit, a deposition unit, and a cutting unit in addition to the defibrating unit, the mixing unit, the moisture-adjusting unit, and the heating unit, which were described above. Additionally, a plurality of configurations can be provided as needed for the defibrating unit, the mixing unit, the heating unit, the crushing unit, the classifier unit, the pressing unit, the screening unit, the refining unit, the deposition unit, and the cutting unit.

1.6.1. Pressing Unit

The sheet manufacturing apparatus 100 of this embodiment may have a pressing unit 60. In the sheet manufacturing apparatus 100 shown in FIG. 1, the pressing unit 60 is arranged downstream of the mixing unit 30 and the moisture-adjusting unit 40, and upstream of the heating unit 50. The pressing unit 60 applies pressure without adding heat to a web W that was passed through the refining unit 70 and the deposition unit 75, which are described later, formed into a sheet shape, and had the moisture adjusted therein. Consequently, the pressing unit 60 does not have a heating means, such as a heater. That is, the pressing unit 60 is configured to perform the so-called calendering process.

The gaps (distances) between fibers in the web W are reduced to increase the density of the web W by applying pressure (compress) to the web W in the pressing unit 60. As illustrated in FIGS. 1 and 3, the pressing unit 60 is configured so that the web W is sandwiched between rollers that apply pressure thereto, and has a pair of pressure rollers 61. The respective center axes of the pair of pressure rollers 61 are parallel. The pressing unit 60 of the sheet manufacturing apparatus 100 of this embodiment is provided with a first pressing unit 60a that is arranged upstream in the transfer direction of the web W and a second pressing unit 60b arranged downstream. The first pressing unit 60a and the second pressing unit 60b are each provided with a pair of pressure rollers 61. In addition, a guide G to assist in the transfer of the web W is arranged between the first pressing unit 60a and the second pressing unit 60b.

The pressure rollers 61 are configured from, for example, a hollow or solid cored bar 62 of, for example, aluminum, iron, or stainless steel. An anti-rust process such as electroless nickel plating or a magnetite film may be applied to, or a separation layer of a tube containing fluorine such as tetrafluoroethylene-perfluoroalkylvinylether copolymer (PFA) or polytetrafluoroethylene (PTFE), or a fluorine coating such as PTFE may be formed on the surfaces of the pressure rollers 61. In addition, an elastic layer based on silicone rubber, urethane, or cotton may be provided between the cored bar 62 and the surface layer described above. By providing the elastic layer, the pair of pressure rollers 61 that press at a high load can be in uniform contact in the axial direction of the pressure rollers 61.

Because the pressing unit 60 only applies pressure without heating, resin in the additive agents does not melt. In addition, almost none of the moisture in the mixture is removed because the pressing unit 60 only applies pressure without heating.

The sheet manufacturing apparatus 100 of this embodiment is provided with the pressing unit 60 (first pressing unit 60a, second pressing unit 60b) and the heating unit 50 (first heating unit 50a, second heating unit 50b). In this example, the heating unit 50 applies pressure to the web W. Preferably, the pressing force of the pressing unit 60 is set to be larger than the pressing force of the heating unit 50. For example, preferably, the pressing force of the pressing unit 60 is set from 500 to 3000 kgf, and the pressing force of the heating unit 50 is set from 30 to 200 kgf. By setting the pressing force of the pressing unit 60 to be greater than that of the heating unit 50, the distances between the fibers included in the web W can be adequately shortened by the pressing unit 60. By heating and applying pressure in this state, a thinner, high-density, and high-strength sheet can be formed.

In addition, in the sheet manufacturing apparatus 100 of this embodiment, the diameter of a pressure roller 61 is set to be greater than the diameter of a heating roller 51 as shown in FIGS. 1 and 3. In other words, the diameter of a pressure roller 61 arranged upstream in the transfer direction of the web W is larger than the diameter of a heating roller 51 arranged downstream. Because the diameter of the pressure roller 61 is large, the web W still in the unpressurized state can be gripped and efficiently transferred. In addition, the web W that passed through the pressure rollers 61 is in the pressurized state and is easily transferred. Therefore, the diameters of the heating rollers 51 arranged further downstream may be smaller than those of the pressure rollers 61. Thus, the configuration of the apparatus can be smaller. The diameters of the heating rollers 51 and the pressure rollers 61 are appropriately set to correspond to the thickness and properties of the manufactured web W.

The illustrated pressing unit 60 is an example of two groups of pressure rollers 61 pairs. When the pressing unit 60 is used and pressure rollers 61 are used as the pressing unit 60, the number and arrangements of the pressure rollers 61 are not limited. Any configuration is possible within the scope of being able to achieve the above actions.

Furthermore, the only part that can come into contact with the web W between the pressure rollers 61 of the pressing unit 60 and the heating rollers 51 of the heating unit 50 is the guide G as the web receiving part that is able to support the web W from below. Consequently, the distance between the pressure rollers 61 and the heating rollers 51 can be shortened. In addition, because the web W with pressure applied is rapidly heated and pressurized, spring back of the web W can be suppressed, and a high-strength sheet can be formed.

The configuration described above for the pressing unit 60 (pressure rollers 61) and the heating unit 50 (heating rollers 51) is intended for a thin, high-density, high-strength sheet. For example, it is intended for paper rather than nonwoven material. On the other hand, the use of a planar pressing unit as the heating unit 50 is intended for a relatively thick sheet. This is for a sheet that is thick and takes a long time to transmit heat to the entire web because the planar pressing unit is in contact with the web W for a longer time than the use of a heating roller. The pressing unit 60 does not have to be upstream of the planar pressing unit. This case is intended for a relatively low-density sheet because there is no high-density compression by the pressing unit 60. The planar pressing unit is used for nonwoven material rather than paper. In the case of nonwoven materials, if the fibers have low moisture content when formed as a sheet, after the planar pressing unit heats and applies pressure, the thickness increases. Changes in the thickness after the application of heat and pressure can be suppressed by having the planar pressing unit apply heat and pressure after the moisture was adjusted.

1.6.2. Classifier Unit

In the sheet manufacturing apparatus 100 illustrated in FIG. 1, the classifier unit 63 is arranged upstream of the mixing unit 30 and downstream of the defibrating unit 20. The classifier unit 63 separates and removes resin particles and ink particles from the defibrated material. This can increase the proportion of fibers in the defibrated material. Preferably, the classifier unit 63 uses an airflow classifier. The airflow classifier generates a rotating airflow to separate according to the sizes and densities of the materials classified by centrifugal force. The classification point can be adjusted by adjusting the velocity of the airflow and the centrifugal force. Specifically, the classifier unit 63 may be a cyclone, an elbow jet, or an eddy classifier. In particular, the cyclone has a simple configuration and can be suitably used as the classifier unit 63. In the description below, the cyclone is used as the classifier unit 63.

The classifier unit 63 has an introduction port 64, a cylinder part 65 connected to the introduction port 64, an inverted cone part 66 that is arranged below and connected to the cylinder part 65, a lower discharge port 67 that is arranged in the lower center part of the inverted cone part 66, and an upper discharge port 68 that is arranged in the upper center part of the cylinder part 65.

In the classifier unit 63, airflow that carries the defibrated material introduced from the introduction port 64 changes to circumferential motion in the cylinder part 65 that has an outer diameter from approximately 100 mm to 300 mm. Thus, fibers in the defibrated material and fine powder, such as resin powder and ink powder in the defibrated material, can be separated by the centrifugal force applied to the introduced defibrated material. Components with many fibers are discharged from the lower discharge port 67 and introduced through the pipe 86 to the mixing unit 30. In addition, fine particles are discharged to outside of the classifier unit 63 from the upper discharge port 68 through the pipe 84. In the illustrated example, the pipe 84 is connected to a receiving unit 69 and the fine particles are collected in the receiving unit 69. Because fine particles such as resin powder or ink powder are discharged to the outside by the classifier unit 63, excess resin can be kept out of the defibrated material even when the resin is supplied by an additive agent supply unit 88 to be described later.

Separation of the fibers and the powder by the classifier unit 63 was described, but complete separation is not possible. For example, relatively small fibers and low-density fibers are sometimes discharged to the outside with the powder. In addition, relatively high-density powder and powder entangled with fibers are sometimes discharged downstream with the fibers.

In addition, when the raw material is a pulp sheet and not used paper, the sheet manufacturing apparatus 100 does not have to include a classifier unit 63 because fine powder, such as resin particles or ink particles, are not included. Conversely, when the raw material is used paper, preferably, the configuration of the sheet manufacturing apparatus 100 includes a classifier unit 63 in order to produce good color tone in the manufactured sheet. In addition, because a better whiteness level is more often sought for paper than for nonwoven material, the classifier unit 63 is often used in the manufacture of paper and not used in the manufacture of nonwoven material.

1.6.3. Crushing Unit

The sheet manufacturing apparatus 100 may include a crushing unit 10. In the sheet manufacturing apparatus 100 shown in FIG. 1, the crushing unit 10 is arranged upstream of the defibrating unit 20. The crushing unit 10 cuts the raw material like pulp sheets or fed-in sheets (e.g., A4-size used paper) in the air to produce the defibration object. The shapes and sizes of the defibration object are not particularly limited. The defibration object may be, for example, several square centimeters. In the illustrated example, the crushing unit 10 can have a crushing blade 11 and use the crushing blade 11 to cut the fed-in raw material. An automatic feeding unit, which is not shown, to continuously feed in the raw material may be provided in the crushing unit 10.

A specific example of the crushing unit 10 is a shredder. In the illustrated example, the defibration object that was cut up by the crushing unit 10 is transferred through a pipe 81 after being received by a hopper 15 to the defibrating unit 20. Pipe 81 passes through the introduction port 21 of the defibrating unit 20.

1.6.4. Refining Unit

The sheet manufacturing apparatus 100 may have a refining unit 70. In the sheet manufacturing apparatus 100 shown in FIG. 1, the refining unit 70 and the deposition unit 75 are arranged downstream of the mixing unit 30. The refining unit 70 introduces the mixture that passed through pipe 86 (mixing unit 30) from the introduction port 71 and is able to drop the mixture while the mixture is dispersed in the air. In addition, in this example, the sheet manufacturing apparatus 100 has a deposition unit 75 that forms the mixture that was dropped from the refining unit 70 and deposited in the air by the deposition unit 75 into the shape of a web W.

The refining unit 70 refines entangled defibrated material (fibers). Furthermore, the refining unit 70 refines the entangled resin when resin in the additive agents supplied from the additive agent supply unit 88 is in a fibrous form. The refining unit 70 acts to uniformly deposit the mixture in the deposition unit 75 to be described later. The term "refine" includes the action of breaking up tangles and the action of uniform deposition. The refining unit 70 has the effect of uniform deposition if there are no tangles.

The refining unit 70 may be a sieve. An example of the refining unit 70 is a rotating sieve that can be rotated by a motor. Here, the sieve of the refining unit 70 may not have a function for screening specific objects. That is, the "sieve" used as the refining unit 70 refers to an object provided with a net (filter, screen). The refining unit 70 may drop down all of the defibrated material and additive agents introduced to the refining unit 70.

1.6.5. Deposition Unit

The sheet manufacturing apparatus 100 may have a deposition unit 75. Defibrated material and additive agents that passed through the refining unit 70 are deposited by the deposition unit 75. As shown in FIG. 1, the deposition unit 75 has a mesh belt 76, stretching rollers 77, and a suction mechanism 78. The deposition unit 75 may be configured to include tension rollers, which are not shown.

The deposition unit 75 forms the web W of the mixture that was dropped from the refining unit 70 and deposited in the air (equivalent to a web forming process combined with the refining unit 70). The deposition unit 75 has a mechanism that deposits the mixture dispersed uniformly in the air by the refining unit 70 onto the mesh belt 76. The configuration may also have a moisture-adjusting unit 40 that adjusts the moisture of the mixture that dropped from the refining unit 70.

An endless mesh belt 76 that forms the mesh stretched by stretching rollers 77 (4 stretching rollers in this embodiment) is arranged below the refining unit 70. The mesh belt 76 is moved in one direction by at least one rotation of the stretching rollers 77.

The suction mechanism 78 is provided vertically below the refining unit 70 as the suction unit that generates airflow vertically downward through the mesh belt 76. The mixture dispersed in the air by the refining unit 70 can be suctioned to the top of the mesh belt 76 by the suction mechanism 78. Thus, the mixture dispersed in the air can be suctioned, and the discharge velocity from the refining unit 70 can be increased. As a result, the productivity of the sheet manufacturing apparatus 100 can be improved. In addition, a downflow can be formed in the drop path of the mixture by the suction mechanism 78 and prevent defibrated material and additive agents from becoming entangled during the drop.

An elongated web W of uniformly deposited mixture can be formed by dropping the mixture from the refining unit 70 while the mesh belt 76 is moving. The term "uniformly deposited" means that the deposited material is deposited to a nearly uniform thickness and roughly identical density. However, the portion that becomes a sheet may be uniform because not all of the deposited material is manufactured into a sheet. "Nonuniform deposition" means that the deposition is not uniform.

The mesh belt 76 can be made of metal, resin, cloth, or nonwoven material, or any material if the mixture can be deposited thereon and airflow can pass therethrough. The hole size (diameter) of the mesh belt 76 is, for example, from 60 µm to 250 µm.

If the hole size of the mesh belt 76 is less than 60 µm, the suction mechanism 78 may have difficulty forming stable airflow. If the hole size of the mesh belt is greater than 250 µm, the fibers of the mixture enter the mesh, for example, and unevenness in the surface of the manufactured sheet becomes substantial. In addition, the suction mechanism 78 may be configured from a sealed box with a window having the desired size opened below the mesh belt 76 to suction air from outside the window to produce negative pressure inside the box with respect to the outside air.

As described above, a web W containing a large amount of air and is pliant and swollen is formed by passing through the refining unit 70 and the deposition unit 75 (web forming process). Next, as shown in FIG. 1, the web W formed on the mesh belt 76 is transferred by rotational motion of the mesh belt 76. In this example, the web W formed on the mesh belt 76 is transported to the moisture-adjusting unit 40, pressing unit 60, and heating unit 50.

1.6.7. Screening Unit

Although not shown, the sheet manufacturing apparatus 100 of this embodiment may also have a screening unit. The screening unit can screen defibrated material, which was produced by defibration in the defibrating unit 20, according to the lengths of the fibers. The removal of fine resin powder in the classifier unit 63 described above was explained, but the screening unit may also have this function. Consequently, the screening unit is arranged downstream of the defibrating unit 20 and further upstream than the refining unit 70. In addition, when provided, the screening unit may be arranged further upstream than the moisture-adjusting unit 40.

The screening unit may be a sieve. The screening unit has a net (filter, screen) to screen objects having sizes that can pass through the net and objects having sizes that cannot pass through. The screening unit can be configured similar to the refining unit 70 described above, and has a function that removes a portion of the ingredients and does not pass all of the materials introduced by the refining unit 70. An example of the screening unit is a rotating sieve that can be rotated by a motor. The net in the screening unit can be a metal net, an expanded metal of a stretched metal panel with openings, or a perforated metal formed by using a pressing apparatus to form holes in a metal plate.

By providing a screening unit, fibers and particles smaller than the size of the net openings that are contained in the defibrated material or the additive agents can be separated from fibers, undefibrated pieces, and lumps that are larger than the net openings. Then, the screened materials are selected and used to correspond to the manufactured sheet. In addition, the materials removed by the screening unit may be returned to the defibrating unit 20.

The sheet manufacturing apparatus 100 of this embodiment may have a configuration other than the configurations described above and may have, when appropriate, a plurality of configurations that correspond to the objectives and include the configuration described above. The number and order of configurations are not limited, and can be appropriately designed to correspond to the objectives.

1.6.8. Other Apparatus

In the sheet manufacturing apparatus 100 of this embodiment, a first cutting unit 90a and a second cutting unit 90b are arranged downstream of the heating unit 50 as the cutting unit 90 to cut the sheet in the direction intersecting the transport direction of the web W (web W passed by the heating unit 50 that becomes a sheet S). The cutting unit 90 may be provided as needed. The first cutting unit 90a is provided with a cutter and cuts a continuous sheet S into individual sheets at the cutting positions set at specified lengths. In addition, the second cutting unit 90b for cutting the sheet S in the transfer direction of the sheet S is arranged downstream of the first cutting unit 90a in the transfer direction of the sheet S. The second cutting unit 90b is provided with a cutter to cut at predetermined positions in the transfer direction of the sheet.

Thus, sheets S having the desired size can be formed. The cut sheets S are stacked in a stacker 95.

Although not shown, a cooling unit for cooling the sheet S heated by the heating unit 50 may be arranged downstream of the heating unit 50. The cooling unit can be configured from, for example, cooling rollers. By providing a cooling unit, cooling of the resin can be rapid, and the structure of the sheet S can be rapidly fixed. Thus, the apparatus can have improved throughput and a smaller size.

2. Sheet Manufacturing Method

The sheet manufacturing method of the embodiment uses the sheet manufacturing apparatus 100 described above and includes a defibrating process that defibrates the defibration object in the air, a mixing process that mixes in the air additive agents including resin into the defibrated material, a moisture-adjusting process that adjusts the moisture of the mixture that mixes the defibrated material and the additive agents, and a heating process that heats the moisture-adjusted mixture. Detailed descriptions of the defibration object, defibrated material, fibers, resins, additive agents, moisture adjustment, and heating are omitted because they are similar to the above descriptions of the sheet manufacturing apparatus.

The sheet manufacturing method of this embodiment may include in the appropriate order at least one process selected from the group of processes: a process that cuts in the air the defibration object such as pulp sheet and used paper as the raw material, a classifying process that classifies from the defibrated material impurities (toner or paper-strengthening agent) and fibers shortened by defibration (short fibers) in the air, a screening process that screens long fibers from the defibrated material (long fibers) and undefibrated fiber pieces that were insufficiently defibrated, a dispersion (refining) process that drops the mixture while dispersing the mixture into the air, a sheet forming process that deposits the dropped mixture in the air to form into a web shape, a pressing process that applies pressure to the web, and a cutting process that cuts the formed sheet. Detailed descriptions of these processes are omitted because they are similar to the above descriptions of the sheet manufacturing apparatus.

According to this sheet manufacturing method, a sheet S can be manufactured in which the bonding forces between the fibers of the defibrated material are provided by resin. For example, when a sheet S manufactured by this sheet manufacturing method is placed in a high-humidity environment or dampened by water, even if the bonding forces of the hydrogen bonds in the defibrated material are reduced, the bonds in the defibrated material are maintained by resin. Therefore, mechanical strength is maintained, and water resistance that makes shape deformation difficult is good. Furthermore, according to this sheet manufacturing method, hydrogen bonds can be elicited as the bonding forces between the fibers comprising the sheet S even when dried defibration object is used or when set up in a low-humidity environment because there is a moisture-adjusting process that adjusts the moisture of the mixture of defibrated material and additive agents. By using this dry type method, a sheet S with good water resistance and high mechanical strength can be manufactured. Furthermore, in this sheet manufacturing method, because moisture is adjusted in the mixture obtained in the mixing process that mixes defibrated material and additive agents, compared to the addition of moisture before the mixture is obtained, additive agents are well dispersed between the fibers in the sheet S. Therefore, the strength of the manufactured sheet S can be further improved.

3. Other Items

In this specification, the term "uniform" as in uniform dispersion or mixing indicates that the relative positions of one ingredient with respect to other ingredients in the materials that are defined as ingredients having two or more types, or two or more phases are uniform throughout the entire system, or mutually identical or essentially equal in each part of the system. In addition, uniformity of the coloring and uniformity of the color tone indicates uniform density without darkening of the color when the sheet is viewed from above. However, similarly, the distances between all of the resin are not the same, and sometimes the density is not the same density throughout.

In this specification, the terms with equivalent meanings are used such as uniform, same, and equal gap; or density, distance, and dimension. Preferably, these are equivalent, but complete equivalence is difficult, and offsets in which accumulated values of unequal errors and fluctuations are included.

Conventionally, when defibrated material and additive agents are mixed, a mixture with good uniformity or a good sheet was relatively easy to obtain because coagulation of the additive agents is suppressed by the actions of the water when water is present in the system (wet type system). Today, however, there is not necessarily an established technology for the manufacture of recycled paper that manufactures recycled paper from used paper in a dry type system. According to studies by the inventors, one reason is the difficulty in creating a process in a dry type system that mixes fibers and paper strengthening agents (e.g., resin particles). That is, when fibers and resin powder are simply mixed without any device in a dry type system, and the fibers and the resin powder are not adequately mixed together and then used in the formation (deposition) of a sheet to obtain paper, the dispersion of resin is nonuniform in the paper surface, and the paper will have inadequate mechanical strength. In addition, when fibers and resin particles are mixed in a dry type system, the resin particles readily coagulate by coagulation forces, such as van der Waals forces, and are easily dispersed nonuniformly.

In the actions and effects described above, the fibers are not only bonded by additive agents, but are bonded by hydrogen bonds. Hydrogen bonds develop because moisture is added, but the bonding of fibers by additive agents is further strengthened by providing some degree of moisture to the fibers. In either case, a strong sheet can be produced in a dry type system independent of the state of the raw materials and the environment of the apparatus by adjusting the moisture of the mixture of fibers and additive agents.

The present invention is not limited to the embodiments described above and may have various forms. For example, the present invention includes configurations essentially identical to the configurations described in the embodiments (configurations with identical functions, methods, and effects, or configurations with the same objectives and effects). The present invention includes configurations in which parts not essential to the configurations described in the embodiments are replaced. In addition, the present invention includes configurations that have the same actions and effects as the configurations described in the embodiments or configurations that can achieve the same objectives. The present invention includes configurations that add known technologies to the configurations described in the embodiments. For example, the web W is a single layer in the embodiment described above, but may have multiple layers, or may have layers of nonwoven materials and paper created separately.

One aspect of a sheet manufacturing apparatus related to the embodiment comprises a defibrating unit configured to defibrate in the atmosphere a defibration object, a mixing unit configured to mix in the atmosphere additive agents containing resin into a defibrated material that has been defibrated, a moisture-adjusting unit configured to adjust moisture in a mixture of the defibrated material and the additive agents, and a heating unit configured to heat the moisture-adjusted mixture that has been moisture-adjusted.

According to this sheet manufacturing apparatus, because the fibers of the defibrated material are bonded by resin, even when the manufactured sheet is placed, for example, in a high-humidity environment or is dampened by water, bonds in the defibrated material the manufactured sheet are maintained by the resin. Therefore, the sheet has good water resistance in which mechanical strength is maintained and shape deformation is difficult. Additionally, a sheet having good mechanical strength can be manufactured by a dry type system because there is a moisture-adjusting unit to adjust the moisture of a mixture of defibrated material and additive agents, and fibers having the appropriate moisture content are used to produce the sheet.

The sheet manufacturing apparatus related to the aspect of the embodiment may have a deposition unit configured to deposit the mixture that has been mixed by the mixing unit. The moisture-adjusting unit may be configured to adjust the moisture of the mixture deposited by the deposition unit.

According to this sheet manufacturing apparatus, the moisture of the mixture can be adjusted after the mixture has been deposited. Thus, the moisture content provided to the mixture by the moisture-adjusting unit is more easily supplied to the entire mixture (deposited material). Therefore, the strength of the manufactured sheet can be further increased.

The moisture-adjusting unit in the sheet manufacturing apparatus related to the aspect of the embodiment may be configured to adjust the moisture such that a moisture content is from 5 parts by weight to 12 parts by weight with respect to 100 parts by weight of the mixture before moisture adjustment.

According to this sheet manufacturing apparatus, the amount of water added by the moisture-adjusting unit is more appropriate; and the mechanical strength of the manufactured sheet can be increased when a small amount of water is used. In addition, excess moisture content can be suppressed even when in a high-humidity environment or when raw materials containing a high level of moisture are used.

The moisture-adjusting unit in the sheet manufacturing apparatus related to the aspect of the embodiment may be configured to adjust the moisture such that a moisture content of the mixture after moisture adjustment is greater than a moisture content included in the defibration object.

According to this sheet manufacturing apparatus, there is more than adequate compensation for the loss of moisture content in the defibrating unit.

In the sheet manufacturing apparatus related to the aspect of the embodiment, the moisture content provided to the mixture by the moisture-adjusting unit may be changed in accordance with at least one of conditions of the moisture content of the defibration object, humidity of the environment, and temperature.

According to this sheet manufacturing apparatus, even if at least one of the conditions of the moisture content of the defibration object, the humidity of the environment, and the temperature varies, fluctuations can be suppressed in the mechanical strength and in the water resistance of the manufactured sheet. Thus, a more stable sheet can be manufactured.

The sheet manufacturing method related to another aspect of the embodiment includes defibrating in the atmosphere a defibration object, mixing in the atmosphere additive agents containing resin into a defibrated material that has been defibrated, adjusting moisture of a mixture of the defibrated material and the additive agents, and heating the mixture that has been moisture-adjusted.

A sheet provided with bonding forces between the fibers of the defibrated material by bonding with resin can be manufactured according to this sheet manufacturing method. A sheet manufactured by this sheet manufacturing method has good water resistance in which mechanical strength is maintained and shape deformation is difficult, because bonds in the defibrated material are maintained by resin even when placed in a high-humidity environment or when dampened by water. In addition, a sheet having good mechanical strength can be manufactured by a dry type method because moisture is adjusted in the mixture obtained by the mixing process that mixes defibrated material and additive agents, and fibers having the appropriate moisture content are used to create a sheet.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A sheet manufacturing method comprising:
defibrating a defibration object into a defibrated material in the atmosphere;
mixing, in the air, additive agents including resin into the defibrated material that has been defibrated;
adding moisture to a mixture of the defibrated material and the additive agents after the mixing is completed; and
heating the mixture that has been moisture-added, to form a sheet.

2. The sheet manufacturing method according to claim 1, further comprising
depositing the mixture at a depositing unit after the mixing, wherein
the adding of the moisture includes adding the moisture to the mixture after the depositing.

3. The sheet manufacturing method according to claim 2, wherein
the depositing includes depositing the mixture on a mesh belt which the depositing unit includes, after the mixing.

4. The sheet manufacturing method according to claim 1, further comprising
pressing the mixture after the adding of the moisture and before the heating of the mixture.

5. The sheet manufacturing method according to claim 3, wherein the pressing of the mixture includes pressing the mixture without fusing the resin, and the heating of the mixture includes heating the mixture to fuse the resin and bond the mixture.

6. The sheet manufacturing method according to claim 1, wherein the adding of the moisture includes adding the moisture such that a moisture content of the mixture is in a range from 5 parts by weight to 12 parts by weight, with respect to 100 parts by weight of the mixture before the adding of the moisture.

7. The sheet manufacturing method according to claim 1, wherein the adding of the moisture includes adding the moisture such that a moisture content after the adding of the mixture is greater than a moisture content included in the defibration object.

8. The sheet manufacturing method according to claim 1., wherein the adding of the moisture includes adding the moisture such that a moisture content given to the mixture is varied in accordance with at least one of conditions of a moisture content of the defibration object, humidity of the environment, and temperature.

* * * * *